(12) United States Patent
Lu

(10) Patent No.: US 9,584,188 B2
(45) Date of Patent: Feb. 28, 2017

(54) NEAR FIELD COMMUNICATION DEVICE AND ACTUATING METHOD THEREOF

(71) Applicant: FIH (HONG KONG) LIMITED, Kowloon (HK)

(72) Inventor: Chun-Yu Lu, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 53 days.

(21) Appl. No.: 14/574,786

(22) Filed: Dec. 18, 2014

(65) Prior Publication Data
US 2016/0056862 A1    Feb. 25, 2016

(30) Foreign Application Priority Data
Aug. 25, 2014   (CN) .......................... 2014 1 0420445

(51) Int. Cl.
*H04B 5/00*    (2006.01)

(52) U.S. Cl.
CPC ......... *H04B 5/0025* (2013.01); *H04B 5/0031* (2013.01)

(58) Field of Classification Search
CPC ...... H04W 4/008; H04W 92/18; H04W 28/18
USPC ........................................................ 455/41.1
See application file for complete search history.

(56) References Cited

U.S. PATENT DOCUMENTS

| 2006/0136997 | A1* | 6/2006 | Telek | G01S 11/06 726/5 |
| 2011/0070828 | A1* | 3/2011 | Griffin | H04M 1/7253 455/41.1 |
| 2011/0070829 | A1* | 3/2011 | Griffin | H04B 5/02 455/41.1 |
| 2011/0070834 | A1* | 3/2011 | Griffin | G06K 7/0008 455/41.1 |
| 2015/0330762 | A1* | 11/2015 | Gong | G01B 5/008 33/503 |

* cited by examiner

*Primary Examiner* — Ankur Jain
(74) *Attorney, Agent, or Firm* — Zhigang Ma

(57) ABSTRACT

A near field communication device communicating with a smart terminal is presented, the near field communication device includes a controller, a near field communication (NFC) module, and a sensor. The sensor detects different operating motions of the near field communication device related to the smart terminal. The controller actuates different operating modes of the NFC module according to different operating motions detected by the sensor. An actuating method of the near field communication device is also provided.

6 Claims, 4 Drawing Sheets

NEAR FIELD COMMUNICATION DEVICE AND ACTUATING METHOD THEREOF

FIELD

The subject matter herein generally to a near field communication device, and particularly relates to a near field communication device having multiple operating modes and an actuating method for the near field communication device.

BACKGROUND

Near Field Communication (NFC) technology is widely used in portable electronic devices nowadays. Most NFC applications of portable electronic devices are related to peer-to-peer data transmission and reading. A communication between two devices having the NFC application is established by touching or by transceiving user instructions.

BRIEF DESCRIPTION OF THE DRAWINGS

Implementations of the present technology will now be described, by way of example only, with reference to the attached figures.

DETAILED DESCRIPTION

Figure 1:
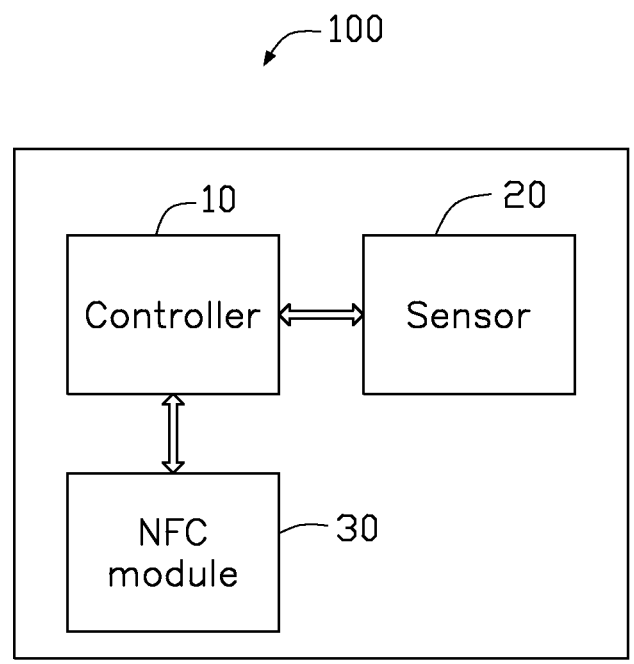
FIG. 1 is a block diagram of an embodiment of a near field communication device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

Figure 2:
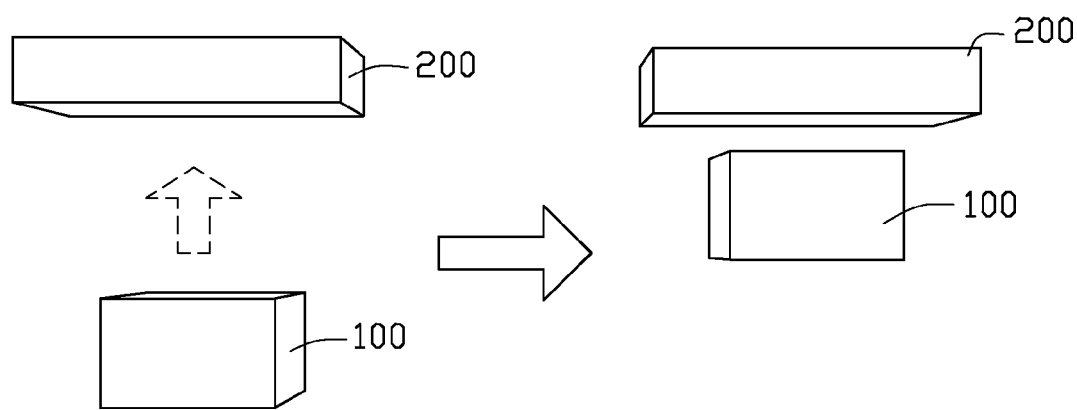
FIG. 2 is an isometric view of the near field communication device in a first operating mode.
Figure 3:
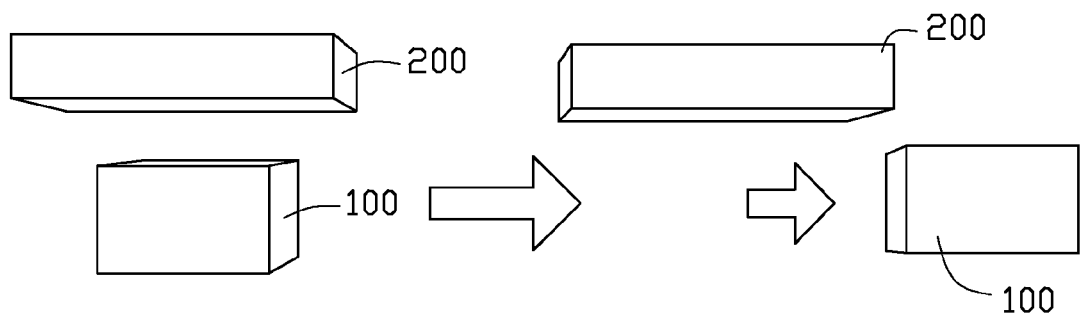
FIG. 3 is an isometric view of the near field communication device in a second operating mode.

FIGS. 1, 2, and 3 illustrate at least one embodiment of a near field communication device 100 communicating with a smart terminal 200. The near field communication device 100 includes a controller 10, a sensor 20, and a Near Field Communication (NFC) module 30. The controller 10 is electrically connected to the sensor 20 and the NFC module 30. The sensor 20 is configured for detecting operating motions of the near field communication device 100 related to the smart terminal 200. The controller 10 actuates different operating modes of the NFC module 30 according to different operating motions detected by the sensor 20. In at least one embodiment, the portable electronic device can be a smart phone, a tablet computer, or a PDA having the NFC module 30. The smart terminal 200 can be a household electronic appliance, a product tag, a BLUETOOTH speaker, or a camera having NFC function.

An actuating method of the near field communication device 100 is described hereinafter. The actuating method is realized by detecting different operating motions of the smart terminal 200 related to the near field communication device 100. The operating motions include a first operating motion and a second operating motion. As shown in FIG. 2, the first operating motion is a movement perpendicularly towards the smart terminal 200 by the near field communication device 100. As shown in FIG. 3, the second operating motion is a movement towards the smart terminal 200 in any direction and then a move parallel to and away from the smart terminal 200 by the near field communication device 100.

When the near field communication device 100 is approaching the smart terminal 200, the sensor 20 detects the operating motions of the near field communication device 100. In at least one embodiment, the sensor 20 can be a three-axis accelerometer, which can precisely detect the operating motions of the near field communication device 100 related to the smart terminal 200. When a distance between the near field communication device 100 and the smart terminal 200 is smaller than a maximum communication range of the NFC module 30, the controller 10 controls the NFC module 30 to establish communication with the smart terminal 200. In a predetermined period after the communication is established, if the sensor 20 detects the first operating motion of the near field communication device 100, the controller 10 actuates a first operating mode of the NFC module 30; if the sensor 20 detects the second operating motion of the near field communication device 100, the controller 10 actuates a second operating mode of the NFC module 30. In some embodiments, if the smart terminal 200 is a product tag, the first operating mode is to capture information of the product from a website, and the second operating mode is to save the website; if the smart terminal 200 is a BLUETOOTH® speaker, the first operating mode is to actuate or disable the BLUETOOTH® speaker, and the second operating mode is to exchange audio data between the near field communication device 100 and the BLUETOOTH® speaker; if the smart terminal 200 is a camera, the first operating mode is to transmit photos to the near field communication device 100 from the camera, and the second operating mode is to upload the photos to a cloud data base.

Figure 4:
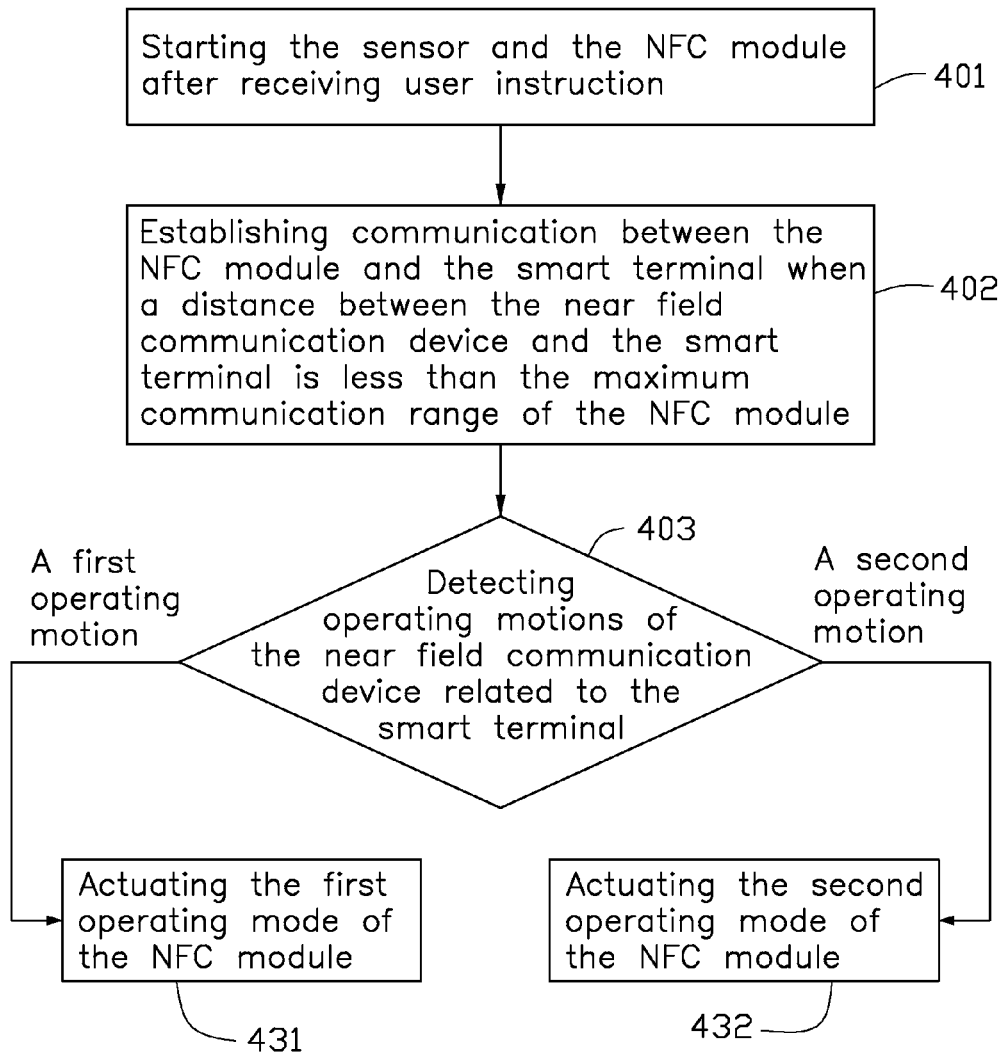
FIG. 4 is a flowchart of an actuating method of the near field communication device.

Referring to FIG. 4, a flowchart is presented in accordance with an example embodiment which is being thus illustrated. The example a method of actuating the near field communication device 100 described below can be carried out using the configurations illustrated in FIGS. 1, 2, and 3, for example, and various elements of these figures are referenced in explaining example method. Each block shown in FIG. 4 represents one or more processes, methods or subroutines, carried out in the exemplary method. Furthermore, the illustrated order of blocks is by example only and the order of the blocks can change according to the present disclosure. Additional blocks may be added or fewer blocks may be utilized, without departing from this disclosure. The exemplary method can begin at block 401.

At block 401, starting the sensor 20 and the NFC module 30 after receiving user instruction. The user of the near field communication device 100 can input instruction to start the NFC module 30.

At block 402, establishing communication between the NFC module 30 and the smart terminal 200 when a distance between the near field communication device 100 and the smart terminal 200 is less than the maximum communication range of the NFC module 30.

At block 403, detecting operating motions of the near field communication device 100 related to the smart terminal 200 via the sensor 20. Actuating a block 431 when the first operating motion is detected; actuating a block 432 when the second operating motion is detected.

At block 431, actuating the first operating mode of the NFC module 30 via the controller 10.

Block 432, actuating the second operating mode of the NFC module 30 via the controller 10.

The near field communication device 100 includes the sensor 20 to detect different operating motions of the near field communication device 100 related to the smart module 200, and includes a controller 10 to actuate different operating modes of the NFC module 30 according different operating motions detected. Therefore, the near field communication device 100 is multi-functional when employing the NFC function, which provides a better user experience.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A near field communication device for communicating with a smart terminal, the near field communication device comprising:
   a controller;
   a near field communication (NFC) module; and
   a sensor configured for detecting different operating motions of the near field communication device related to the smart terminal, the controller actuating different operating modes of the NFC module according to different operating motions detected by the sensor;
   wherein the NFC module establishes communication with the smart terminal when a distance between the near field communication device and the smart terminal is less than a maximum communication distance of the NFC module;
   wherein the operating motions include a first operating motion and a second operating motion, the first operating motion is a movement perpendicularly towards the smart terminal by the near field communication device; the second operating motion is a movement towards the smart terminal in any direction and then a move parallel to and away from the smart terminal by the near field communication device;
   wherein when the sensor detects the first operating motion of the near field communication device in a predetermined period after establishing the communication between the NFC module and the smart terminal, the controller actuates a first operating mode of the NFC module; and
   wherein when the sensor detects the second operating motion of the near field communication device in the predetermined period after establishing the communication between the NFC module and the smart terminal, the controller actuates a second operating mode of the NFC module.

2. The near field communication device as claimed in claim 1, wherein the controller is electrically connected to the sensor and the NFC module.

3. The near field communication device as claimed in claim 1, wherein the sensor is a three-axis accelerometer.

4. An actuating method of a near field communication device, the near field communication device communicating with a smart terminal, the actuating method comprising:
   establishing communication between a near field communication (NFC) module of the near field communication device and the smart terminal;
   starting a sensor to detect operating motions of the near field communication device related to the smart terminal;
   actuating a first operating mode of the NFC module if a first operating motion of the near field communication device is detected in a predetermined period after establishing the communication between the NFC module and the smart terminal; and
   actuating a second operating mode of the NFC module if a second operating motion of the near field communication device is detected in the predetermined period after establishing the communication between the NFC module and the smart terminal;
   wherein the NFC module establishes communication with the smart terminal when a distance between the near field communication device and the smart terminal is less than a maximum communication distance of the NFC module;
   wherein the operating motions include a first operating motion and a second operating motion, the first operating motion is a movement perpendicularly towards the smart terminal by the near field communication device; the second operating motion is a movement towards the smart terminal in any direction and then a move parallel to and away from the smart terminal by the near field communication device;
   wherein when the sensor detects the first operating motion of the near field communication device in a predetermined period after establishing the communication between the NFC module and the smart terminal, the controller actuates a first operating mode of the NFC module; and
   wherein when the sensor detects the second operating motion of the near field communication device in the predetermined period after establishing the communication between the NFC module and the smart terminal, the controller actuates a second operating mode of the NFC module.

5. The actuating method as claimed in claim 4, further comprising starting the NFC module after receiving user instruction.

6. The actuating method as claimed in claim 5, further comprising starting a controller configured for actuating the operating modes of the NFC module.

* * * * *